United States Patent [19]

Boylan et al.

[11] 4,377,493

[45] Mar. 22, 1983

[54] DEFOAMER COMPOSITION AND USE THEREOF

[75] Inventors: Francis J. Boylan, Newton; Clemmon Porter, Boonton; Olga D. Bruno, Randolph, all of N.J.

[73] Assignee: Drew Chemical Corporation, Boonton, N.J.

[21] Appl. No.: 277,630

[22] Filed: Jun. 26, 1981

[51] Int. Cl.³ .................... B01D 19/02; B01D 19/04
[52] U.S. Cl. .................................. 252/321; 252/358
[58] Field of Search .................. 252/321, 358, 319; 106/288 B

[56] References Cited

U.S. PATENT DOCUMENTS

| | | | |
|---|---|---|---|
| 3,076,768 | 2/1963 | Boylan | 252/358 |
| 3,408,306 | 10/1968 | Boylan | 252/358 |
| 3,591,519 | 7/1971 | Boylan | 252/321 |
| 3,661,793 | 5/1972 | Curtis | 252/321 |
| 3,723,342 | 3/1973 | Shane et al. | 252/358 |
| 4,032,473 | 6/1977 | Berg et al. | 252/358 |
| 4,198,267 | 4/1980 | Flaherty | 162/158 |
| 4,225,456 | 9/1980 | Schmidt et al. | 252/321 |

OTHER PUBLICATIONS

Gardner, "Paint Testing Manual", Thirteenth Edition, 1972, p. 228.

Primary Examiner—Allan Lieberman
Attorney, Agent, or Firm—Elliot M. Olstein; Louis E. Marn

[57] ABSTRACT

A defoamer comprised of silica having hydrophobic surfaces dispersed in a water insoluble hydrophobic organic liquid, wherein the silica has a surface area of no greater than 0.1 m²/g and the hydrophobic silica comprises in excess of 25 wt. percent of the composition.

13 Claims, No Drawings

DEFOAMER COMPOSITION AND USE THEREOF

This invention relates to defoamers.

Defoamers, as known in the art, are employed to breakdown existing foam and/or to prevent the formation of foam. Thus, for example, such defoamers are used for preventing and/or eliminating foam in boiler water, textile processing, boiling sugar-beet runoffs, paper making, and in addition, such defoamers have been added to paints, coatings and the like so as to avoid foaming caused by entrained air bubbles which could disfigure the coated surface.

A defoamer composition which has been found to be particularly effective is comprised of silica having hydrophobic surfaces dispersed in a water insoluble hydrophobic organic liquid; e.g., U.S. Pat. Nos. 3,408,306; 3,076,768, etc. The silica employed in such compositions is characterized by a surface area in the order of from 50–300 $m^2/g$, with such silica being chemically prepared, in particular, by precipitation from silicate solutions. Such silica, after being treated to provide hydrophobic surfaces, is then dispersed in an organic liquid, with such silica not exceeding 20%, by weight, of the composition in order to avoid handling difficulties; i.e., above about 15% solids, the viscosity becomes so high that the product cannot be handled.

In accordance with one aspect of the present invention, there is provided an improved defoamer composition comprised of silica having hydrophobic surfaces (hydrophobic silica) dispersed in a water insoluble hydrophobic organic liquid wherein the hydrophobic silica is present in the composition in an amount in excess of 25 wt. percent and no greater than 65 wt. percent of the total composition, and wherein the silica used for producing the hydrophobic silica is characterized by a surface area of no greater than 0.1 $m^2/g$.

In accordance with another aspect of the present invention, such defoamer composition is employed in an aqueous system in an effective defoaming amount to control foaming therein.

Applicant has found that by using a silica having a surface area lower than those previously used in the art, it is possible to provide a defoamer composition having increased quantities of hydrophobic silica component to thereby increase the defoaming efficiency thereof, while maintaining a low enough viscosity to prevent handling difficulties. In addition, such defoamer is less expensive as a result of the use of lower amounts of material to effect hydrophobing of the silica, and further as a result of the decreased cost of the silica as compared to the hydrophobic organic liquid.

More particularly, the silica which is used for preparing the hydrophobic silica for the defoamer composition of the present invention is a mineral or mined silica (sometimes commercially called an amorphous silica even though the silica may not be amorphous), as compared to the chemically prepared silicas employed in prior art defoamers. As hereinabove noted, the surface area of such silica does not exceed 0.1 $m^2/g$, and preferably does not exceed 0.01 $m^2/g$. The surface area is generally at least 0.0001 $m^2/g$, and most generally is at least 0.0005 $m^2/g$. The silicas typically have surface areas in the order of from 0.0005 to 0.002 $m^2/g$.

The silica generally has an average particle size of less than ten microns, with the average particle typically being in the order of from 1 to 5 microns.

The silica of the type hereinabove described is treated to provide hydrophobic surfaces. Thus, for example, such silica may be treated with methylchlorosilane vapors, by heating with silicone oil, or by treatment with a reactive silicone oil at room temperature. The silica may also be hydrophobed after being dispersed in the organic liquid by the addition of a reactive silicone oil; i.e., the silica is hydrophobed, in situ, at room temperature.

In accordance with the invention, it is possible to render the surface of the silica hydrophobic with amounts of treating agent, and in particular a silicone oil, which are less than those heretofore required in the art. Thus, for example, in treating with a silicone oil, it is possible to provide hydrophobic surfaces by employing silicone oil in an amount of from 0.3% to 3%, by weight, based on the silica, as compared to the 8–15 weight percent generally used in the art. It is to be understood that greater amounts could be used; however, such use, in most cases, would be wasteful.

The silica having hydrophobic surfaces is employed in a defoamer composition by dispersing such silica in a water insoluble hydrophobic organic liquid, of a type known in the art to be suitable for such defoamer compositions. In accordance with the present invention, hydrophobic silica is present in an amount in excess of 25%, by weight, of the total composition, with the silica generally not exceeding about 65%, by weight of the entire composition. In accordance with the preferred aspects of the invention, the silica is employed in an amount of from 40% to 60%, by weight, of the entire composition.

The water soluble hydrophobic organic liquid, as hereinabove noted, may be any one of a wide variety of organic liquids conventionally employed in such defoamer compositions, with such liquids generally having viscosities in the range of from 30 to 400 SUS (100° F.), and preferably viscosities of from 25 to 100 SUS (100° F.). The hydrophobic organic liquid is preferably a liquid hydrocarbon, and such hydrocarbon may be aliphatic, alicyclic or aromatic, or mixtures thereof. Thus, for example, the hydrocarbon may be a mineral hydrocarbon, including mineral oils, paraffin oils, naphthenic oils, kerosene and similar petroleum fractions, vegetable oils, and the like. In some cases, it is also possible to use water insoluble hydrophobic liquids containing polar groups. The selection of a suitable water insoluble hydrophobic organic liquid is deemed to be well within the scope of those skilled in the art from the teachings herein.

The silica, having hydrophobic surfaces, may be dispersed in the organic liquid by simple mixing or by the use of suitable milling devices; e.g., a colloid mill, homogenizer, and the like.

In some cases, a thickening agent for hydrocarbons is added to the defoamer composition in an amount effective for inhibiting the settling of the hydrophobic silica to thereby maintain the hydrophobic silica dispersed in the organic liquid. Such thickening agents are known in the art, with a treated bentonite (BENTONE 34) providing good results. In most cases, it is not necessary to add the thickening agent in an amount in excess of 1% of the composition.

Another method of inhibiting the settling of the hydrophobic silica, if required, is by emulsifying water in the defoamer composition to thereby provide a water-in-oil emulsion as the liquid phase. The water may be emulsified in the oil after dispersion of the hydrophobic silica. In most cases, the water, if used, is present in amounts of less than 30% of the liquid phase.

The defoamer composition may include other components to improve the effectiveness thereof. Thus, for example, as known in the art, the defoamer may optionally include a surfactant and/or silicone oil. The selection of additional material for use in a defoamer composition is deemed to be within the scope of those skilled in the art from the teachings herein.

The defoamer composition prepared in accordance with the invention may be employed for controlling foam in an aqueous system by adding to such system an effective defoaming amount of the composition. The amount employed will vary with the system; however, in general, such defoamer is added in an amount of at least 5 ppm, and in most cases, it is not necessary to add an amount in excess of 1%, although, as should be apparent greater amounts could be employed; however, such greater amounts are not economically justified. In most cases, defoamer is added in an amount of from 15 ppm up to 1% depending upon the system in which the defoamer is employed. Thus, for example, the use of the defoamer in paints generally requires amounts greater than those required for treatment of water in a paper making operation. The selection of an optimum amount of the defoamer is deemed to be within the scope of those skilled in the art from the teachings herein.

The defoamer of the present invention is suitable for inhibiting foaming in an wide variety of aqueous systems, including aqueous (latex) paints, pulp and paper mills, boiler water, textile processing, etc.

The invention will be further described with respect to the following example; however, the scope of the invention is not to be limited thereby:

EXAMPLE I

A. A mined silica with an SiO$_2$ content of 99.5%, average particle size of 2.8 microns and surface area of 0.0008 m$^2$/g (IMSIL 1240 sold by Illinois mineral Company) is treated at room temperature with 1%, by weight, of SWS Silicone F 830 (a silicone oil comprised of 65% dimethylpolysiloxane and 35% of octamethylpolytetracyclosiloxane) to render the surfaces of the silica hydrophobic. The treated silica was dispersed in a mineral oil (Gulf 333 Oil) by a propeller agitator, using a ratio of 1:1 treated silica to oil.

The composition was tested for defoaming efficiency by adding 0.5% of the above composition to an acrylic latex and shaking for five minutes on a Red Devil Paint Shaker. The density was measured before and after shaking and the % of air entrainment calculated. The % air was 4.4%.

B. A defoamer composition was formed by treating precipitated silica (surface area: 125–150 m$^2$/g; average particle size 14–22 millimicrons) with 11% of dimethylpolysiloxane and dispersing 11% of the treated silica in Gulf 333 Oil to provide 11%, by weight, of the treated silica.

The use of this defoamer in the test described in A. showed 16% air entrainment.

C. The composition of I A. was added in an amount of 100 ppm to 500 mls of a pulp mill screen room stock. The mixture was shaken in a 1000 ml graduate and the volume of foam formed was 45 mls. In the absence of the defoamer, the volume of formed foam was 200 mls.

EXAMPLE II

A mined silica having an average particle size of 1 micron and surface area of 0.002 m$^2$/g (IMSIL A 108) was treated as described in I A. and employed to form a defoamer composition as described in I A.

The use of the defoamer in shake tests in pulp mill screen room stock (as in I C.) showed good defoaming (foam volume of 50 mls).

EXAMPLE III

The following illustrates a preferred composition employing a thickening agent to inhibit settling of the hydrophobic silica:

|     |                              | %    |
|-----|------------------------------|------|
| (A) | Fuel Oil #2                  | 48.9 |
|     | Imsil 1240                   | 50.0 |
|     | Reactive Silicone (SWS F-830)| 1.0  |
|     | Ammonium hydroxide (29% as NH$_3$) | 0.1 |

This was stirred for 1½ hours.

A gel of treated bentonite (BENTONE 34 sold by NL Industries) was prepared:

|     |                    |      |
|-----|--------------------|------|
| (B) | Fuel Oil #2        | 87.0 |
|     | Bentone 34         | 10.0 |
|     | Methanol/water 95/5| 3.0  |

This was stirred until smooth. 90% of A and 10% of B were blended and sandmilled for 4 minutes.

The shake test in an acrylic latex (Rhoplex AC490) of 0.5% of the above defoamer showed an air entrainment of 3.2%.

The present invention is particularly advantageous in that it is possible to provide an improved defoamer, at lower cost, and without the high viscosities which would cause handling difficulties. These and other advantages should be apparent to those skilled in the art from the teachings herein.

Numerous modifications and variations of the present invention are possible in light of the above teachings and, therefore, within the scope of the appended claims, the invention may be practised otherwise than as particularly described.

We claim:

1. In a defoamer composition wherein hydrophobic silica is dispersed in a water insoluble hydrophobic organic liquid, the improvement comprising:
said hydrophobic silica being present in an amount in excess of 25% and no greater than 65%, by weight, of the composition, and said hydrophobic silica having been prepared from a silica having a surface area of no greater than 0.2 m$^2$/g.

2. The composition of claim 1 wherein the silica has a surface area of no greater than 0.01 m$^2$/g.

3. The composition of claim 1 wherein the surface area is at least 0.0001 m$^2$/g.

4. The composition of claim 3 wherein the hydrophobic silica is present in an amount of from 40% to 60% by weight.

5. The composition of claim 1 wherein the silica is a mined silica having a surface area of from 0.0005 to 0.002 m$^2$/g.

6. The composition of claim 5 wherein the hydrophobic silica is present in an amount of from 40% to 60%, by weight.

7. The composition of claim 1 and further comprising a thickening agent for the organic liquid to inhibit settling of the hydrophobic silica.

8. The composition of claim 1 wherein water is emulsified in the organic liquid to inhibit settling of the hydrophobic silica.

9. The composition of claim 6 and further comprising a thickening agent for the organic liquid to inhibit settling of the hydrophobic silica.

10. The composition of claim 6 wherein water is emulsified in the organic liquid to inhibit settling of the hydrophobic silica.

11. In a process for controlling foam in an aqueous system, the improvement comprising:
    employing an effective defoaming amount of a defoamer composition as defined in claim 1 in said aqueous system.

12. The process of claim 11 wherein the defoamer composition is as defined in claim 4.

13. The process of claim 11 wherein the defoamer composition is as defined in claim 6.

* * * * *